(No Model.) 5 Sheets—Sheet 1.
J. J. TOWNSEND.
RECORDING COMPASS.
No. 477,282. Patented June 21, 1892.
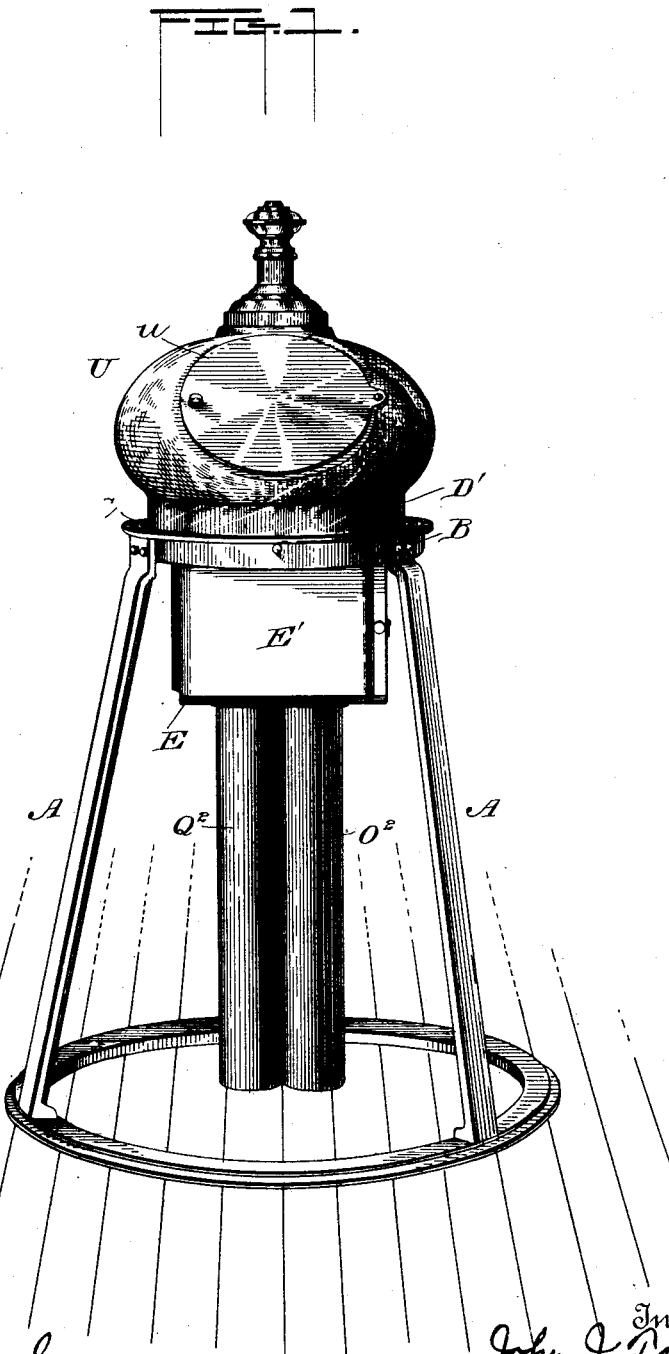
Witnesses
Inventor
John J. Townsend,
By Geo. F. Whitesey
Attorney (No Model.) 5 Sheets—Sheet 2.
J. J. TOWNSEND.
RECORDING COMPASS.
No. 477,282. Patented June 21, 1892.
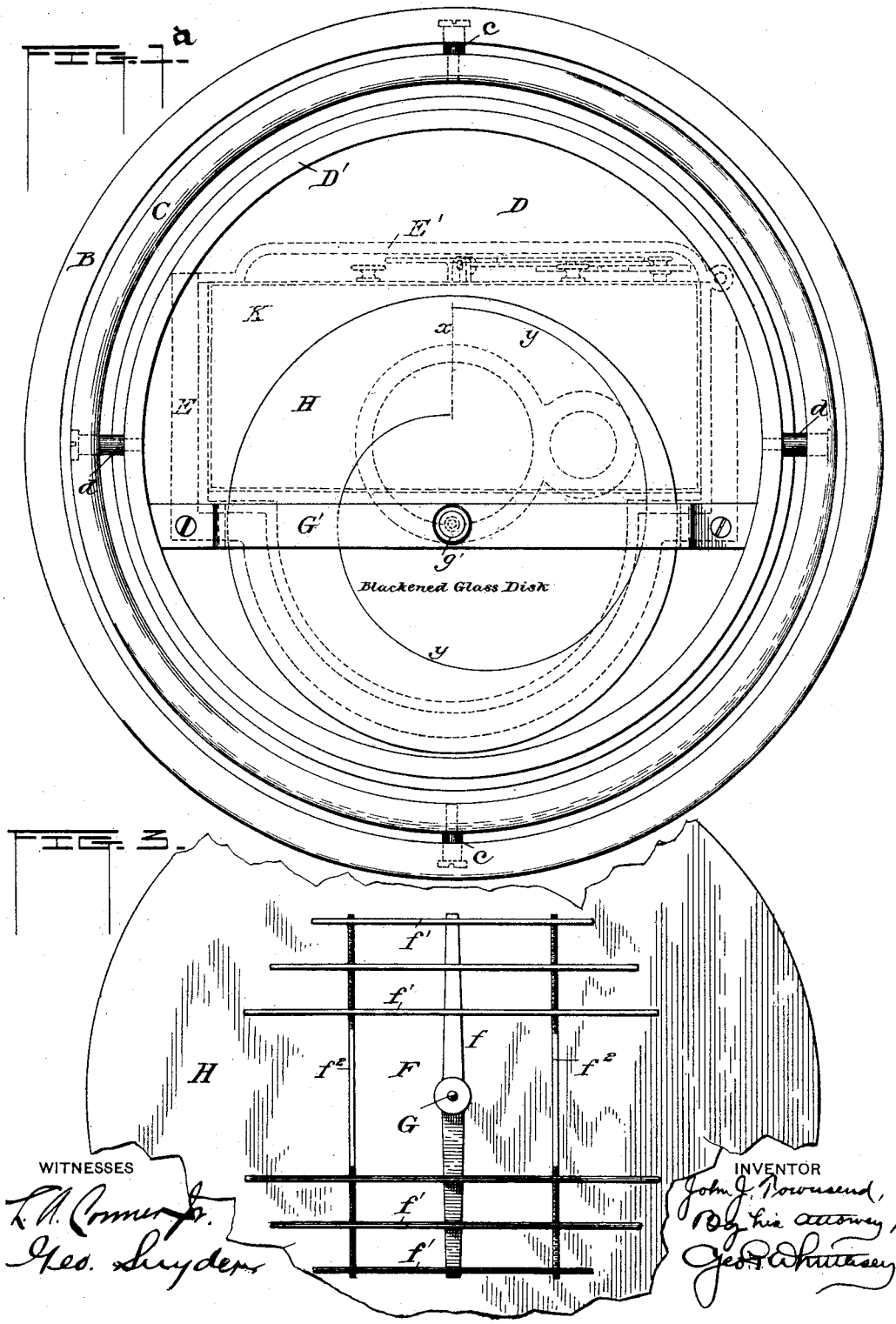
WITNESSES
INVENTOR
John J. Townsend,
By his attorney

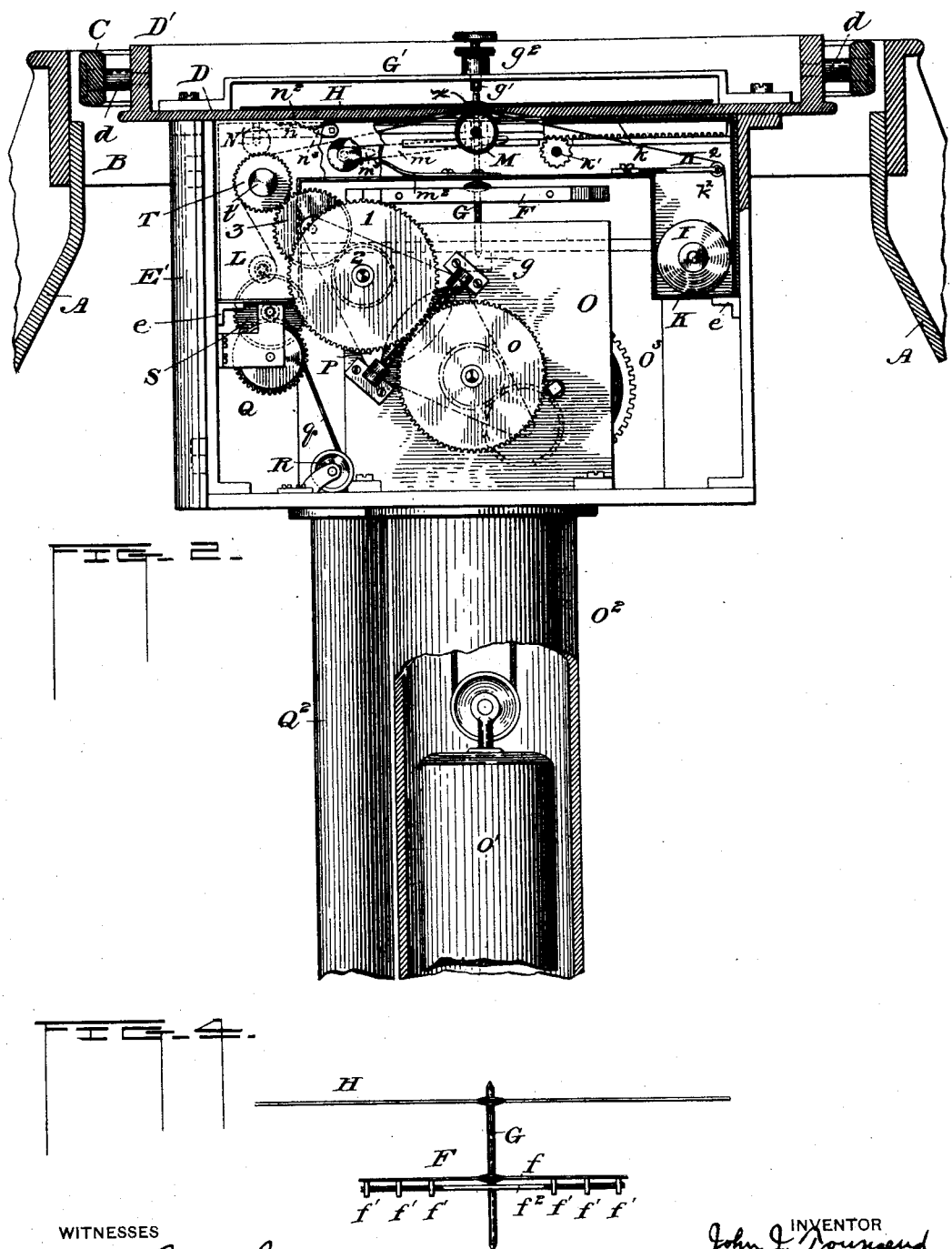

(No Model.) J. J. TOWNSEND. 5 Sheets—Sheet 4.
RECORDING COMPASS.
No. 477,282. Patented June 21, 1892.
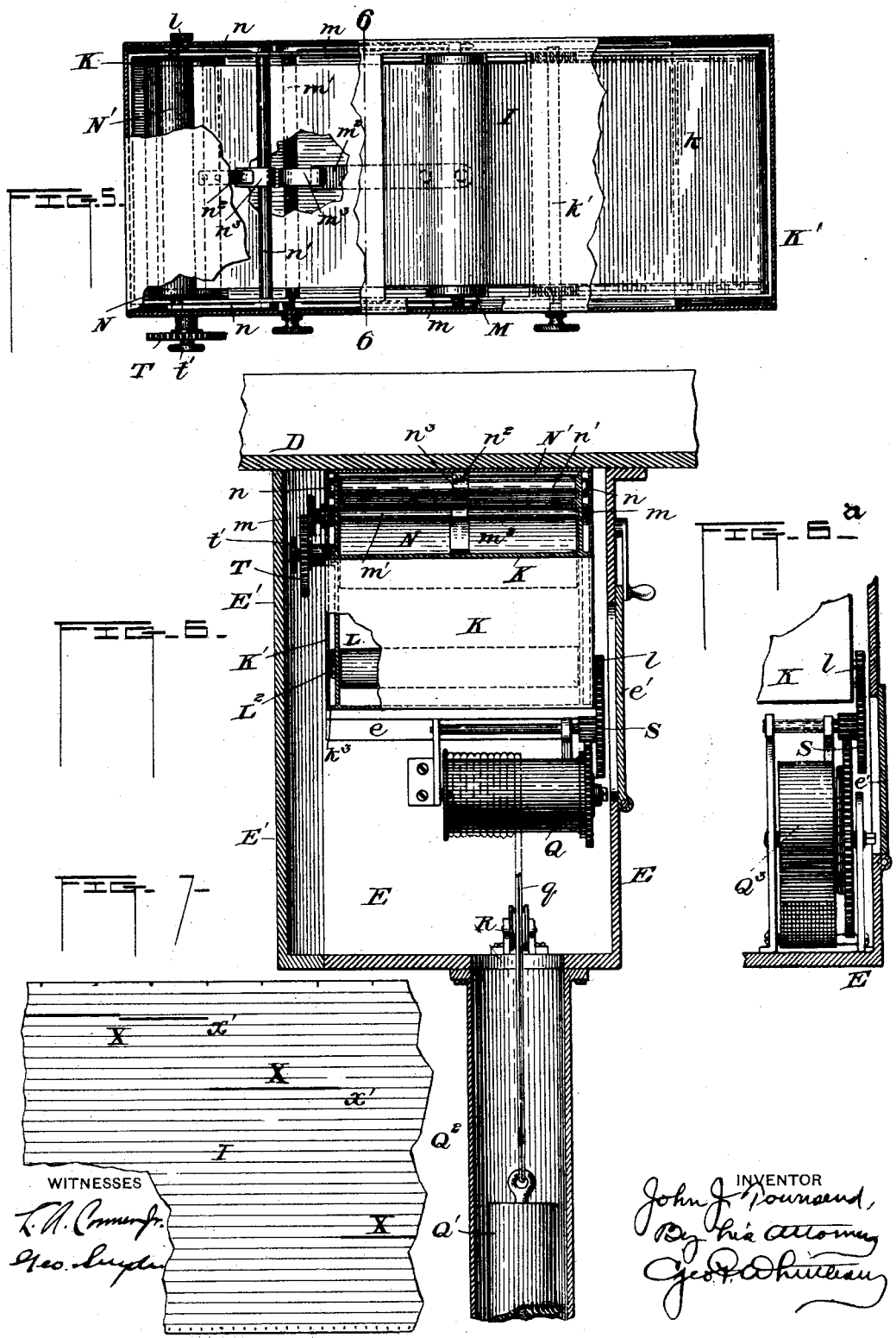

(No Model.) 5 Sheets—Sheet 5.
J. J. TOWNSEND.
RECORDING COMPASS.
No. 477,282. Patented June 21, 1892.
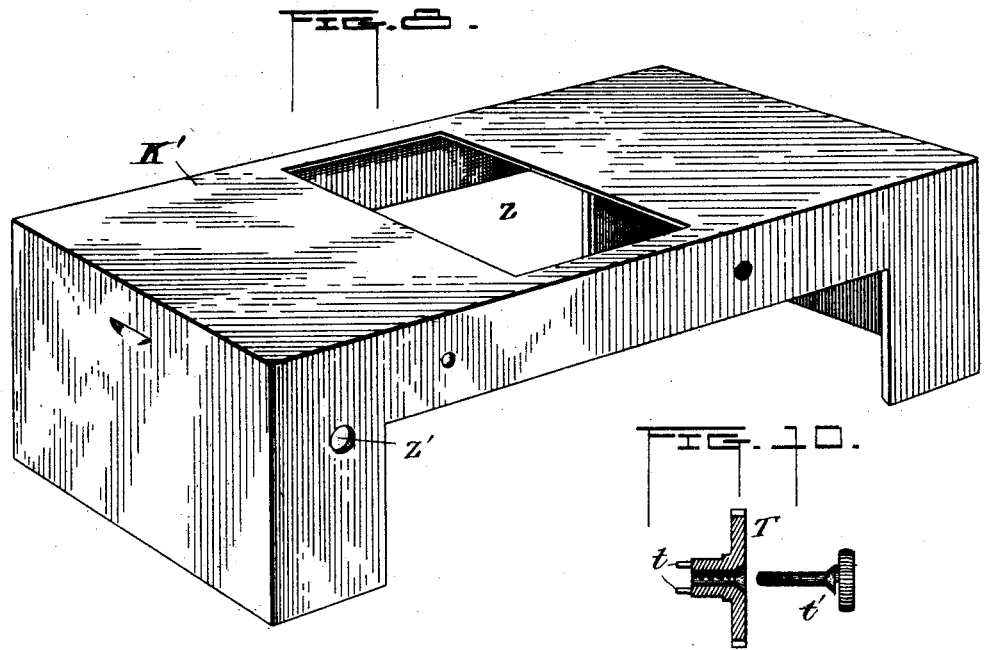
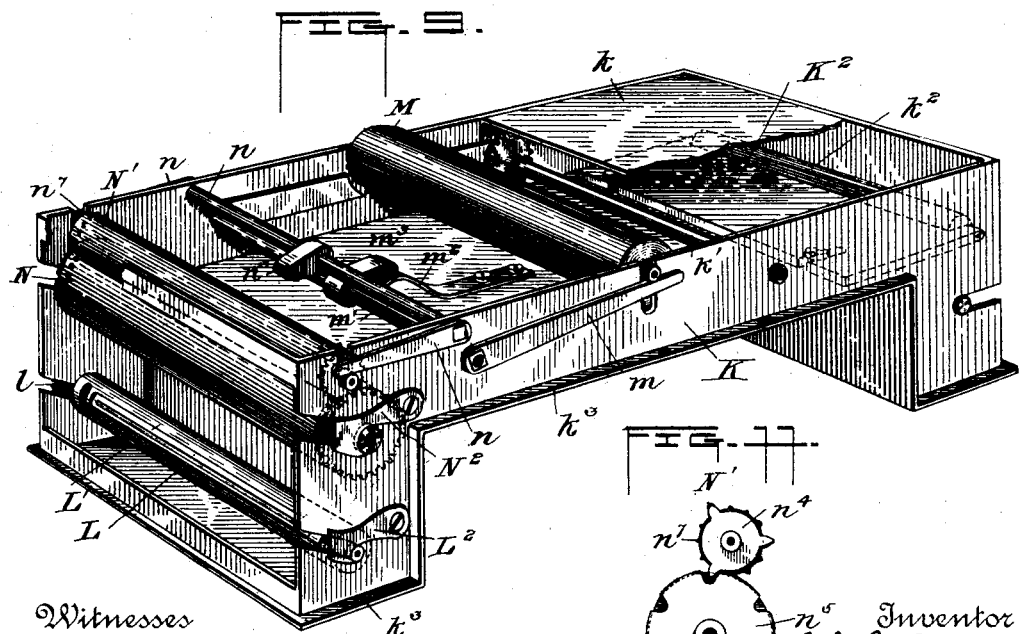
Witnesses
L. A. Connor Jr.
Geo. Snyder
Inventor
John J. Townsend
By Geo. H. Whitney
Attorney

UNITED STATES PATENT OFFICE.

JOHN J. TOWNSEND, OF PORTSMOUTH, VIRGINIA, ASSIGNOR TO THE TOWNSEND MARINE INVENTION COMPANY, OF BALTIMORE, MARYLAND.

RECORDING-COMPASS.

SPECIFICATION forming part of Letters Patent No. 477,282, dated June 21, 1892.

Application filed August 28, 1891. Serial No. 403,968. (No model.)

*To all whom it may concern:*

Be it known that I, JOHN J. TOWNSEND, a citizen of the United States, residing at Portsmouth, in the county of Norfolk and State of Virginia, have invented certain new and useful Improvements in Recording-Compasses; and I do declare the following to be a full, clear, and exact description of the invention, such as will enable others skilled in the art to which it appertains to make and use the same, reference being had to the accompanying drawings, and to letters and figures of reference marked thereon, which form a part of this specification.

My invention relates generally to the art of navigation, and more especially to a compass arranged and constructed to make a continuous record of its movements, and thus produce a permanent log of the courses run by the vessel. It is a well-known fact that time is frequently lost on a voyage by the inefficiency or inattention of the steersman, since any variation from the true course involves a retardation of speed and a lengthening of the distance run. In cases of collision it is exceedingly difficult to ascertain afterward the exact course each vessel was steering. So, too, when a ship is maliciously or carelessly wrecked the fact that she was off her course is one which the guilty parties are most anxious to conceal and one which is very hard to prove in evidence.

My invention is designed to record every course the vessel runs, and thus provides an effectual means of discovering just how the vessel was heading at any particular moment during her voyage and how long she sailed on any course. Among the many advantages to be derived from such a record, in addition to the check it gives upon the accuracy of the pilot, may be mentioned the possibility of laying down the courses on the chart should a long spell of stormy weather prevent the taking of observations.

In carrying out my invention I avail myself of the art of photography, arranging suitable mechanism to cause a strip of sensitized paper to travel slowly under a narrow slot, which is screened from the light at all but one spot by a movable opaque disk or plate, itself containing a narrow transparent line or slot arranged to cross the aforesaid slot and adapted to change the point of intersection at every movement, however slight, of the compass-needle. The result of this contrivance is that a continuing broken line is photographed on the paper agreeing exactly with the movements of the vessel and forming when developed and fixed a permanent record of the courses she has run. By means of suitable auxiliary devices the strip is marked at regular intervals of time, so that the record gives not only the directions run, but the time spent on each course.

The accompanying drawings illustrate one way of reducing my invention to practice.

Figure 1 is a perspective view of the entire machine. Fig. 1$^a$ is a top plan view. Fig. 2 is an elevation with the door open and certain parts shown in cross-section. Fig. 3 is a bottom plan view of the compass needle and disk. Fig. 4 is a side elevation of the same. Fig. 5 is a top plan view, partly in section, of the removable dark-box. Fig. 6 is a vertical section on line 6 6, Fig. 5. Fig. 6$^a$ is a modification. Fig. 7 shows a portion of the record. Fig. 8 is a perspective view of the cover of the dark-box. Fig. 9 is a perspective view of the dark-box with the cover removed. Fig. 10 shows the detachable driving-gear, and Fig. 11 is an end view of the feed-rolls.

Suitable legs or standards A are secured to the deck and support a ring or frame B, in which is journaled the gimbal-ring C on trunnions $c$. Within the gimbal is a circular plate D, having a flange D', which carries trunnions $d$, by which the plate is hung upon the gimbal, the trunnions $c$ and $d$ being at right angles. The plate D forms the top of the case E, said case being suitably attached to the under side of said plate.

*The compass-needle.*—Inside the case E is the needle F, firmly secured to a vertical shaft G, which is stepped in a bearing $g$ and projects up through the top plate D, its upper end being received in a bearing $g'$ in a bridge G', secured upon the top plate. Both bearings are preferably conical, and the upper one is adjustable axially, being formed in the end of a screw working in a threaded boss on the bridge and having a jam-nut $g^3$ to hold it when adjusted. The needle may be of any suitable construction. For instance, as shown in Figs. 3 and 4, a cross-bar or yoke $f$ is rigidly secured to the shaft G. One or more magnetized bars $f'$ are attached at their centers to the yoke near the ends of the same. A rod $f^2$, having right-hand screw-threads at one end and left-hand threads at the other, is screwed into threaded holes in or near the ends of the magnetized bars, one such rod being placed on each side of the yoke and parallel with it. By means of these rods the bars $f'$ can be adjusted to exact parallelism with each other. The battery of magnets forms a very powerful compass-needle by reason of the leverage they exert on the shaft G. The needle is set to swing some little distance below the top D, as shown in Fig. 2.

*The changeable aperture.*—In the top D of the case is cut a fine straight slit $x$—say three one-thousandths of an inch in width and two or three inches long. The slit is radial to the shaft G and preferably a short distance therefrom, as shown in Fig. 1$^a$. A wide beveled recess is cut in the under side of the top plate, the slit $x$ being at the summit of the recess, so that the thickness of the top D adjacent to the slit is very slight. Covering the slit is a screen adapted to be moved by the magnetic needle. I prefer to construct this screen as follows: Secured to the shaft G above and close to the top D is an opaque disk H, of suitable material, containing a diaphanous spiral $y$, consisting of a single turn with its ends lying in or nearly in the same radial line. I prefer to have one end terminate a trifle short of the same radial line as the other by an amount equal to the width of the slit $x$ for the reason hereinafter explained. The disk may be made of sheet metal, hard rubber, papier-maché, or other light stiff material, with the spiral $y$ sawed through it. I prefer, however, to use a sheet of thin glass blackened on its under side, the spiral being formed by removing the opaque coating. The width of the spiral should be about the same as that of the slit $x$. The spiral is so laid out that the distance between its ends, measured on a radial line, is substantially the same as the length of the slit $x$, and the disk is so arranged with relation to the slit that the spiral constantly intersects a vertical plane passing through the slit. Whenever the disk is moved by the needle, the point of intersection of the slit and spiral changes, so that every point on the compass-card has its own distinct point of intersection. It is evident, therefore, that a record of the successive points of intersection will be a record of the movements of the compass-card, or, in other words, of the different courses sailed by the vessel. The case E is light-proof, so that no light can enter it except through the minute changeable aperture at the intersection of the slit and spiral. I cause the pencil of light thus formed to write a record of its movements by permitting it to fall upon a sensitized surface traveling in the case just below the slit $x$. The continuous movement of the paper causes the pencil of light to trace a line X on the sensitized surface, the position of the line shifting laterally across the paper as the disk swings to and fro with the compass-needle. So long as the vessel holds on a straight course the line will be parallel with the edges. Should the course be changed, the line will break off, as at $x'$, but will again proceed parallel with the line of travel of the paper when the helm is brought back amidships, though at another part of the strip corresponding with the new course. It will be noticed that the ends of the spiral do not lie in the same radial line, but that the inner end of the spiral is separated from the radial line of the other end by a space equal to the width of the slit $x$. The object of this is to permit the formation of but one course-line when the vessel is steering due north, the outer end of the spiral being carried to the "N." point on the card, while the inner end will stop short of it. It is evident that if both ends of the spiral ran to the "N." point the light would pass through both ends of it when a north course was being steered. It also follows from this construction that when the course changes from east of north to west of north the record-line is abruptly terminated on one side of the strip and continues at a transversely-opposite point near the other side. It should be remarked, too, that the compass-needle is not hampered by any device tending to retard its changes, even the most minute. The only work it has to perform is overcoming and resisting the inertia of the disk H, and since this is made extremely light a powerful needle easily operates it.

*The dark-box.*—The most convenient sensitized surface to use is ordinary photographic paper, either silver-print or blue-print paper, as may be desired. The paper may be plain; but I prefer to rule it longitudinally with thirty-two parallel and equidistant lines corresponding with the points of the compass, so that the record may be easily read. A strip of this paper is wound into a roll I and placed in one end of the light-proof box K, which fits into the case E. The strip is wound upon a roller at the other end of the box by suitable mechanism, passing close under the slit $x$ in its travel through the box. A screen in the top of the box is drawn aside to permit the pencil of light entering through the slit to affect the paper. The width of the strip is of course slightly greater than the length of the slit $x$. The box I prefer to use is made as shown in the drawings, being shallow to stand above the needle F, which swings freely under it, and having at each end a depending well to hold the roll of paper I and the receiving and winding roller L. The box rests on brackets $e$, with its top snugly up against the top D. A cover K' is fitted to slide down over the box K, its edges abutting upon a flange $k^3$, so that the sides of the box are double, as shown in Fig. 6. About midway of the cover is an opening $z$, adapted to be closed by a screen or slide $k$, running on suitable ledges inside the box K and moved by a transverse shaft $k'$, carrying one or more pinions meshing with a rack or racks secured to the slide, as shown. The opening in the cover registers with the beveled recess in the under side of the top D. The paper runs up over a small roller $k^2$, journaled in the end of an adjustable slide $K^2$. It passes thence over the roller M, which presses the paper up into the recess in the top plate and close against the slit $x$, so that the light cannot strike any part of the paper except that immediately below the slit. The roller is journaled in vertical slots in the box K, its projecting journals resting on the ends of the rock-arms $m$ on the rock-shaft $m'$. A spring $m^2$ bears against a rock-arm $m^3$ and presses the roller M normally upward. When the screen $k$ is shut preparatory to removing the box K from the case E, it crowds the roller M down into the box and slides over it. After leaving the roller M the paper passes over a feed-roll N, being held in close frictional contact therewith by a presser-roller N', journaled in slots in the box K, the ends of a pair of rock-arms $n$ on a shaft $n'$ bearing upon the projecting journals. Attached to the inside of the cover K' is a spring $n^2$, bearing on the rock-arm $n^3$ and exerting a downward pressure on the roll N'. The rolls N N' are geared together, as shown. At the other end the presser-roll has a small sprocket-wheel $n^4$, meshing with a suitably-notched disk $n^5$ on the feed-roll N and serving to keep the two rolls in accurate relationship. At each end of one of the rolls is a series of prick-points $n^7$ to indent the edges of the record-paper at regular intervals. The feed-roll N is journaled in inclined slots in the box K, and latches $N^2$ engage with the projecting journals to hold the roll in place. In the cover K' there is a hole $z'$, which registers with the end of this journal and permits the hub of the gear-wheel T to be inserted. The hub is provided with one or more pins $t$, which enter holes in the end of the journal, and the two parts are fastened together by a screw $t'$, which is inserted through the tubular hub of the gear-wheel and screws into the end of the journal, Fig. 10. The box K is removable from the case E, being adapted to be slid out laterally when the door E' is opened. This enables me to insert the roll of paper I in a dark-room, close the screen $k$, place the box in the case, and then slide back the screen by means of the button on the outer end of the shaft $k'$. When the paper has been exhausted, the screen is closed and the box is removed to the dark-room, where the record can be developed and fixed and a fresh roll of paper placed in the box and all without any risk of exposing the paper to the light.

*The driving and winding mechanism.*—Within the case E, below the box K, is a train of clock-work contained in a frame O and driven, preferably, by a spring in the drum $O^3$. Should it be desired, however, to use a weight O' instead of the spring, then a depending tube $O^2$ is attached to the bottom of the case E to inclose the weight. A gear-wheel $o$ is carried on the end of one of the shafts of the train projecting through the frame O. Meshing with this is a wheel 1, preferably of the same size and forming part of a train of gears 1 2 3, carried in a frame P, which is hinged to the frame O, the axis of the hinge being perpendicular to the line joining the centers of the gear-wheels $o$ 1. The cog-wheel 3 meshes with the wheel T, secured upon the projecting end of the shaft that carries the feed-roll N. By means of these gears the clock-work is caused to rotate the feed-rolls at a uniform speed, the time being recorded by the prick-points $n^7$. It will be noticed that the cog-wheels 1 and 3 overlap the ends of the box K. When it is desired to remove the box for the purpose above set forth, the train 1 2 3 can be folded back against the gear-wheel $o$, as shown in dotted lines in Fig. 2, by reason of the hinged attachment of the frame P, thus leaving the box free to be slid out of the case. The winding-drum L is provided with some means for clamping the end of the paper I. As shown in the drawings, the drum is hollow and contains a longitudinal slit to receive the end of the paper. A sleeve L' surrounds the drum, being provided also with a slit. After inserting the paper the sleeve is partially revolved, carrying the two slits out of line and firmly nipping the paper between the sleeve and the drum. The journals of the drum L are held in place in slots in the box K by means of latches $L^2$.

Journaled in suitable bearings in the case E is a drum Q, on which is wound a cord $q$, the end of which is attached to a weight Q', sliding in a tube $Q^2$, which is preferably arranged parallel with and secured to the tube $O^2$. A suitable pulley R prevents the cord from chafing on the edge of the tube. A spring-drum $Q^3$ may be used in place of the drum Q, cord, and weight. The motion of the drum Q is conveyed by a train of multiplying-gears S, as shown, to a pinion $l$ on the rear end of the shaft carrying the drum L. The weight Q' is just sufficient to keep a light steady tension on the paper, so that it is snugly wound up as fast as it passes the feed-rolls N N'. In the back of the case E is a door $e'$, which gives access to these gears for the purpose of winding up the weight or of guiding the pinion $l$ into mesh with its driving-gear when the box K is slid into its case.

It is of course necessary that all the various parts of the apparatus shall be constructed of brass, phosphor-bronze, or some other non-magnetic metal, so as not to affect the compass-needle. Artificial light may be provided to affect the sensitized paper. A binnacle-lamp with a reflector is easily arranged to throw sufficient light upon the disk H to effect the desired result. I prefer to use such a lamp constantly, by day as well as by night, in order to give better control of the illumination and to secure a more uniform record. The hood U may have a suitable slide $u$ to enable the disk to be inspected from time to time. The disk is preferably provided with the points of the compass, so as to constitute a compass-card.

The machine can be placed in a vessel in any desired position, though it is preferable to arrange the split $x$ due fore and aft parallel with the line of the keel.

When used as a tell-tale, the device can be locked up and arranged in such a manner that the record can only be read by the person having the proper key.

Having thus described my invention, what I claim, and desire to secure by Letters Patent, is—

1. The combination, with a case having a slit, of a vertical shaft carrying a magnetic needle and an opaque disk containing a diaphanous spiral line, forming but a single turn and intersecting the plane of the slit, substantially as described.

2. The combination, with a case having a slit, of a magnetic needle and a screen covering said slit and adapted to be moved by the needle, said screen consisting of a sheet of glass or other transparent material having an opaque coating, a portion of said coating being removed in a line intersecting the plane of the slit, substantially as described.

3. The combination, with a case having a slit, of a vertical shaft carrying a magnetic needle and a glass disk blackened on one side, the opaque coating being removed in a spiral line, substantially as described.

4. The combination, with a case having a slit, of a vertical shaft carrying a magnetic needle and an opaque disk having a diaphanous spiral line forming but a single turn, with its ends falling short of the same radial line by an amount equal to the width of the slit, substantially as described.

5. A recording-compass comprising a suitable case for the compass-needle and a removable dark-box for containing a sensitized surface to be affected by the movements of the compass-needle, substantially as described.

6. The combination, with the case E, containing the shaft and compass-needle, of the shallow box adapted to fit up against the top of the case above the needle, substantially as described.

7. A recording-compass comprising the case E, the removable box K, having an opening in its top, the slide $k$, adapted to close said opening and provided with a rack, and the shaft $k'$, carrying a pinion meshing with said rack, substantially as described.

8. A recording-compass comprising the box K, having an opening in its top, the screen $k$ for closing said opening, the rock-shaft $m'$, having rock-arms $m\ m^3$, the roller M, journaled on the arms $m$, and the spring $m^2$, bearing against the arm $m^3$, substantially as described.

9. A recording-compass comprising the case E, the box K, removable therefrom and containing the feed-roll N, whose axle carries the cog-wheel T outside of the box K, the clock-work G, contained in a frame secured to the case E, and a train of gears adapted to connect the clock-work and the cog-wheel T when the box is placed in the case, substantially as described.

10. A recording-compass comprising the case E, the box K, removable therefrom and containing the winding-drum L, a pinion $l$ on the axle of the winding-drum and outside of the box, a drum Q, journaled in fixed bearings in the case E, a weighted cord wound on the drum, and gearing connected with the drum and adapted to mesh with the pinion $l$ when the box K is placed in the case, substantially as described.

11. A recording-compass comprising the case E, the removable box K, containing the feed-roll N, provided with a cog-wheel T outside of the box, the clock-work having a gear-wheel $o$, and a train of gears connecting the gear-wheel $o$ and cog-wheel T, said train being mounted on a frame adapted to be swung clear of the box K when the latter is to be removed from the case, substantially as described.

12. In a recording-compass, the combination, with the casing containing a slit, of the magnetic needle secured to the vertical spindle, the disk H, mounted on the spindle in close proximity to the slit in the casing and containing the spiral $y$, which makes substantially a complete turn and is thereby adapted to intersect the plane of the slit at every position of the needle, a sensitized strip arranged to travel at one side of the spindle, and a motor for moving the strip, substantially as described.

13. In a recording-compass, the combination, with the casing having in its top D the slit $x$, of the spindle G, passing below the top D and having the magnetic needle secured to it, the disk H, mounted on the spindle just above the top D and having the spiral $y$, making substantially a complete turn and intersecting the plane of the slit $x$, the traveling sensitized strip arranged below the top D at one side of the spindle, and a motor for moving the strip, substantially as described.

14. A recording-compass comprising the casing having the slit $x$, the dark-box arranged below the top D, the spindle arranged at one side of the dark-box and carrying the disk H above the top of the casing, and a long magnetic needle secured to the spindle and arranged to swing below the dark-box, substantially as described.

15. The combination, with the casing having the slotted top D, of the magnetic needle F, secured upon the spindle G, the conical step-bearing $g$, and the adjustable conical bearing $g'$ for the spindle, the disk H, secured to the spindle just above the top D, the dark-box immediately below the top D at one side of the spindle, and means for moving a sensitized strip in the dark-box, substantially as described.

16. A recording-compass comprising, in combination with the magnetic needle, a screen having a slot, and a disk having a spiral $y$, forming but a single turn and intersecting the plane of the slot, its ends lying nearly in the same radial line and both on the same side of the center of the disk, substantially as described.

17. A recording-compass comprising a case having a beveled recess in the under side of its top and a slit at the summit of the recess, a movable screen controlling the passage of light through said slit, a sensitized strip traveling below the slit, and a suitable device for pressing said strip into the recess, substantially as described.

In testimony whereof I affix my signature in presence of two witnesses.

JOHN J. TOWNSEND.

Witnesses:
S. G. HOPKINS,
GEO. P. WHITTLESEY.